United States Patent
Igawa et al.

(10) Patent No.: US 10,695,918 B2
(45) Date of Patent: Jun. 30, 2020

(54) TRANSFER SYSTEM, TRANSFER APPARATUS AND MODULE

(71) Applicant: DAIHEN Corporation, Osaka-shi, Osaka (JP)

(72) Inventors: Tomohide Igawa, Osaka (JP); Yuya Sakaguchi, Osaka (JP); Takaya Yamada, Osaka (JP)

(73) Assignee: DAIHEN Corporation, Osaka-shi, Osaka (JP)

( * ) Notice: Subject to any disclaimer, the term of this patent is extended or adjusted under 35 U.S.C. 154(b) by 337 days.

(21) Appl. No.: 15/832,130

(22) Filed: Dec. 5, 2017

(65) Prior Publication Data
US 2018/0161993 A1 Jun. 14, 2018

(30) Foreign Application Priority Data
Dec. 9, 2016 (JP) .................................. 2016-239882

(51) Int. Cl.
*B25J 17/00* (2006.01)
*B25J 17/02* (2006.01)
(Continued)

(52) U.S. Cl.
CPC .............. *B25J 19/0029* (2013.01); *B25J 9/08* (2013.01); *B25J 9/12* (2013.01); *B25J 13/08* (2013.01);
(Continued)

(58) Field of Classification Search
CPC ....... H02P 7/06; B25J 19/0025; B25J 19/0029
See application file for complete search history.

(56) References Cited

U.S. PATENT DOCUMENTS 5,669,749 A * 9/1997 Danielson ............ B25J 19/0025
191/12 R
2005/0103148 A1* 5/2005 Inoue .................. B25J 19/0029
74/490.02
(Continued)

FOREIGN PATENT DOCUMENTS

JP 2002-301684 A 10/2002
JP 2003-319693 A 11/2003
(Continued)

OTHER PUBLICATIONS

Notification of Reasons for Refusal for Japanese Application No. 2016-239882 dated Mar. 10, 2020, with its English translation, 10 pages.

*Primary Examiner* — Jake Cook
(74) *Attorney, Agent, or Firm* — Bret E. Field; Bozicevic, Field & Francis LLP

(57) ABSTRACT

A transfer system is provided with a transfer apparatus that has an arm mechanism to transfer a workpiece, a control device that supplies electric power to the transfer apparatus and controls the motions of the transfer apparatus, and a power cable that connects between the control device and the transfer apparatus. The control device sends and receives a signal for controlling the transfer apparatus through the power cable. The transfer apparatus is provided with a plurality of motors for driving the transfer apparatus, a plurality of drive control sections for applying electric power supplied from the control device to the plurality of motors for driving the motor, and internal power lines that connect the plurality of drive control sections. The plurality of drive control sections each sends and receives the signal to and from the control device through the power cable and the internal power lines and drives the motor according to the signal.

15 Claims, 8 Drawing Sheets

(51) Int. Cl.
  *B25J 18/00*   (2006.01)
  *B25J 19/00*   (2006.01)
  *B25J 13/08*   (2006.01)
  *B25J 15/02*   (2006.01)
  *B65G 47/90*   (2006.01)
  *G05B 19/18*   (2006.01)
  *B25J 9/08*    (2006.01)
  *B25J 9/12*    (2006.01)

(52) U.S. Cl.
  CPC .............. *B25J 15/02* (2013.01); *B65G 47/90* (2013.01); *G05B 19/18* (2013.01)

(56) References Cited

U.S. PATENT DOCUMENTS

| | | | |
|---|---|---|---|
| 2015/0096401 A1* | 4/2015 | Nagai | B25J 9/1674 |
| | | | 74/490.02 |
| 2015/0100159 A1 | 4/2015 | Park et al. | |
| 2016/0120021 A1* | 4/2016 | Iida | H05K 1/142 |
| | | | 361/749 |
| 2016/0271807 A1* | 9/2016 | Kawauchi | B25J 19/0029 |
| 2017/0015008 A1* | 1/2017 | Yamazaki | B25J 19/0025 |
| 2017/0244284 A1* | 8/2017 | Takahashi | H02J 50/12 |
| 2018/0001487 A1* | 1/2018 | Miyasaka | B25J 9/0018 |
| 2018/0093376 A1* | 4/2018 | Teranaka | B25J 9/044 |

FOREIGN PATENT DOCUMENTS

| | | |
|---|---|---|
| JP | 2011-259535 A | 12/2011 |
| JP | 2014-158178 A | 8/2014 |

\* cited by examiner

TRANSFER SYSTEM, TRANSFER APPARATUS AND MODULE

CROSS-REFERENCE TO RELATED APPLICATIONS

This Non-provisional application claims priority under 35 U.S.C. § 119(a) on Patent Application No. 2016-239882 filed in Japan on Dec. 9, 2016, the entire contents of which are hereby incorporated by reference.

FIELD

The present invention relates to a transfer system and a transfer apparatus that transfer a workpiece, and to a module that constitutes the transfer apparatus.

BACKGROUND

There is a transfer system including a transfer apparatus that transfers a plate-shaped workpiece while holding it with a hand and a control device that controls the motions of the transfer apparatus. The transfer apparatus is provided with a plurality of motors that raise or lower a base and rotates the joint of an arm mechanism, drive sections, and various sensors. The transfer apparatus and the control device are connected by a number of electrical lines including main power supply lines for supplying electric power to the motors, communication lines for sending and receiving signals to control rotation of the respective motors, and signal lines for sending and receiving signals from the various sensors.

Japanese Patent Application Laid-Open No. 2011-259535 discloses a motor control system including a controller and a motor that are connected to a common DC power supply in which the controller controls the movement of the motor by power line communication.

Furthermore, Japanese Patent Application Laid-Open No. 2003-319693 discloses a motor control system in which current for driving a motor and a control signal are supplied through a common wiring system to thereby reduce the number of harnesses and connectors.

SUMMARY

The conventional transfer system has a configuration in which various sensors and drive sections of a transfer apparatus are connected to a control device through a number of electrical lines. Thus, an addition of a sensor or the like according to the requirement specification may need more time required for a wire routing design and increase the number of manufacturing processes, resulting in increase in manufacturing costs.

It is an object to provide a transfer system, a transfer apparatus and a module that are capable of shortening the time required for a wire routing design in the transfer apparatus and reducing the number of manufacturing processes regardless of the number of motors, drive control sections and sensors that constitute the transfer apparatus.

A transfer system according to one aspect of the present disclosure comprises: a transfer apparatus provided with an arm mechanism having a hand for holding a workpiece and being rotatably supported to a base; a control device that supplies electric power to the transfer apparatus and controls motions of the transfer apparatus; and a power cable that connects between the control device and the transfer apparatus, wherein the control device comprises a communication section that sends and receives a signal for controlling the transfer apparatus through the power cable, and the transfer apparatus comprises a plurality of motors for driving the transfer apparatus, a plurality of drive control sections that apply electric power supplied from the control device to the plurality of motors for driving the motors and an internal power line that connects between the plurality of drive control sections and transmits electric power supplied from the control device, and wherein one of the drive control sections is connected to the control device by the power cable, and each of the drive control sections sends and receives the signal to and from the control device and another one of the drive control sections through the power cable and the internal power line, and drives the motor according to the signal.

A transfer apparatus according to one aspect of the present disclosure comprises: an arm mechanism having a hand for holding a workpiece and being rotatably supported to a base; a plurality of motors each driving the transfer apparatus; a plurality of drive control sections that apply electric power supplied from an external control device to the plurality of motors for driving the motors; and an internal power line that connects the plurality of drive control sections and transmits electric power supplied from the control device, and each drive control section sends and receives a signal applied from the control device to and from the another one of the drive control sections through the internal power line and supplies electric power responsive to the signal to the motor.

A module according to one aspect of the present disclosure comprises: a drive control section that applies electric power supplied from an external control device to a motor for driving a transfer apparatus provided with an arm mechanism having a hand for holding a workpiece and being rotatably supported to a base for driving the motor; and a plurality of power terminals to which internal power lines for transmitting electric power supplied from the control device are to be connected, and the plurality of power terminals are electrically connected to each other, and the drive control section sends and receives signals for controlling motions of the transfer apparatus to and from the control device and another external module through the internal power lines and supplies electric power responsive to the signals to the motor.

According to an aspect of the present disclosure, it is possible to shorten the time required for a wire routing design in the transfer apparatus and reduce the number of manufacturing processes regardless of an increase in the number of drive control sections and sensors that constitute the transfer apparatus.

The above and further objects and features will more fully be apparent from the following detailed description with accompanying drawings.

DETAILED DESCRIPTION

Figure 1:
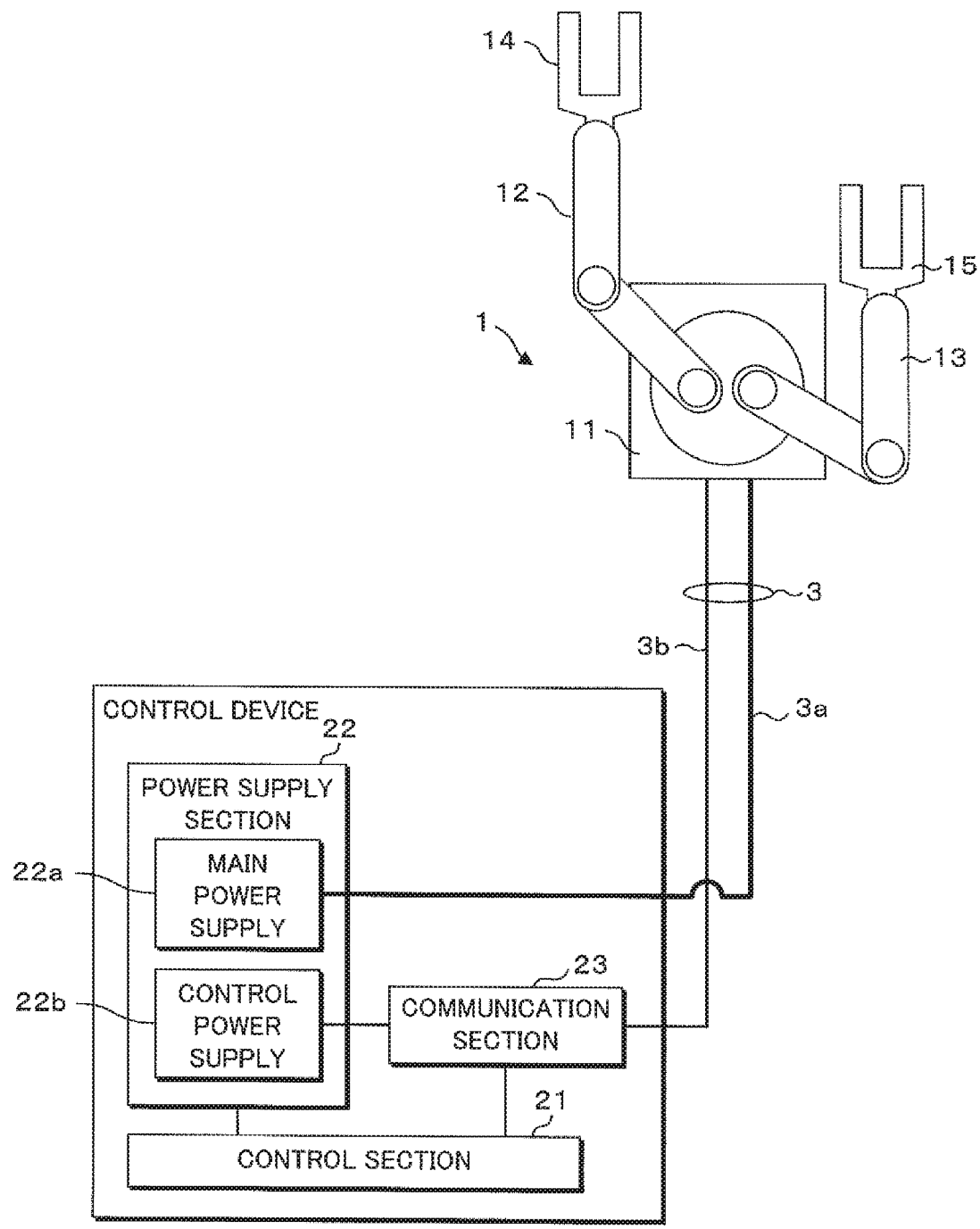
FIG. 1 is a schematic diagram illustrating a transfer system according to Embodiment 1.

The outline of embodiments according to the present disclosure is described.

A transfer system according to one aspect of the present disclosure comprises: a transfer apparatus provided with an arm mechanism having a hand for holding a workpiece and being rotatably supported to a base; a control device that supplies electric power to the transfer apparatus and controls motions of the transfer apparatus; and a power cable that connects between the control device and the transfer apparatus, and the control device is provided with a communication section that sends and receives a signal for controlling the transfer apparatus through the power cable, and the transfer apparatus is provided with a plurality of motors each of which drives the transfer apparatus, a plurality of drive control sections that apply electric power supplied from the control device to the plurality of motors for driving the motors and an internal power line that connects between the plurality of drive control sections and transmits electric power supplied from the control device, and one of the drive control sections is connected to the control device by the power cable, and each of the drive control sections sends and receives the signal with the control device and another drive control section through the power cable and the internal power line and drives the motor according to the signal.

The control device supplies electric power to the transfer apparatus through the power cable. The control device also sends and receives a signal for controlling motions of the transfer apparatus through the power cable. At least one of the drive control sections is operated by the electric power supplied through the power cable, sends and receives a signal through the power cable, and drives the motor according to the received signal. The plurality of drive control sections are connected by the internal power line, and another one of the drive control sections is operated by the electric power supplied via the above-described one drive control section, sends and receives a signal via the one drive control section, and drives the motor according to the received signal.

Hence, regardless of an increase in the number of motors and drive control sections that constitute the transfer apparatus, the number of electrical lines connecting between the transfer apparatus and the control device can be reduced. This shortens the time required for a wire routing design and reduces the number of manufacturing processes. This also enables manufacturing of a transfer system complying with a particular requirement specification in short delivery times. Furthermore, a flexible adaptation to a request for an addition of the drive parts, attachment of sensors or the like is made possible. In addition, reduction in the number of electrical lines routed in the transfer apparatus prevents a malfunction such as disconnection in the movable part.

It is noted that the internal power line and the power cable do not necessarily mean to be routed inside and outside the housing, respectively. The internal power lines are power lines for connecting the plurality of drive control sections to form a drive control system of the transfer apparatus. The power cable is a power line for connecting the drive control system and the control device. This embodiment includes a configuration in which the control device and the power cable are accommodated in the housing forming the base of the transfer apparatus, for example.

Preferably, the power cable includes a first power line that transmits electric power for driving the motor and a second power line that transmits electric power for operating the drive control section, and the internal power line includes a third power line that transmits electric power for driving the motor and a fourth power line that transmits electric power for operating the drive control section, and the control device and the drive control section send and receive the signal through the second power line and the fourth power line.

The transfer apparatus and the control device are connected by the first power line that transmits electric power for driving the motor and the second power line that transmits electric power for operating the drive control section. Similarly, the respective drive control sections inside the transfer apparatus are connected by the third power line and the fourth power line. The control device and the plurality of drive control sections send and receive signals through the second power line and the fourth power line.

Thus, the control device and the plurality of drive control sections send and receive desired signals even in a state where electric power supply to drive the motors is suspended. This enables monitoring of signals from various sensors in a state the motors are turned off, for example.

Furthermore, the drive control section preferably comprises a driving circuit board having a plurality of first power terminals to which the first power line or the third power line is connected, the first power terminals being electrically connected to each other, and a communication circuit board having a plurality of second power terminals to which the second power line or the fourth power line is connected, the second power terminals being electrically connected to each other.

The driving circuit board has the plurality of first power terminals. This allows one driving circuit board to be connected with the other driving circuit boards or the other control devices. Similarly, the communication circuit board has the plurality of second power terminals. This allows one communication circuit board to be connected with the other communication circuit boards or the other control devices.

This makes it possible to connect the plurality of drive control sections to the control device in series or in parallel, and reduce the number of internal power lines connecting between the control device and the plurality of drive control sections.

It is also preferable that the plurality of drive control sections are connected in series by the internal power line.

The plurality of drive control sections are connected in series by the internal power line. This makes it possible to simplify the wiring in the transfer apparatus, and shorten the time required for a wire routing design and reduce the number of manufacturing processes.

It is further preferable that the plurality of driving circuit boards and the plurality of communication circuit boards are ones manufactured from a standardized circuit board.

The plurality of driving circuit boards are standardized. Also, the plurality of communication circuit boards are standardized. This enables reduction in the number of types of the components.

It is also preferable that the first power terminals included in the respective drive control sections have the same shape, and the second power terminals included in the respective drive control sections have the same shape.

The first power terminals included in the respective drive control sections have the same shape with each other. The second power terminals included in the respective drive control sections have the same shape with each other. This enables commonality of the driving circuit boards and the communication circuit boards and achieves reduction in manufacturing costs.

It is further preferable that the transfer apparatus is provided with a sensor for controlling the transfer apparatus, and the drive control section sends a signal output from the sensor to the control device through the internal power line and the power cable.

The control device can receive a signal output from the sensor included in the transfer apparatus through the internal power line and the power cable. This configuration eliminates the need for a signal line dedicated to a sensor, and makes it possible to simplify the wiring in the transfer apparatus and to shorten the time required for a wire routing design and reduce the number of manufacturing processes.

It is also preferable that the plurality of motors include a motor for raising or lowering the arm mechanism.

This configuration eliminates the need for a power line and a signal line dedicated to a motor for raising or lowering the arm mechanism. This makes it possible to simplify the wiring inside the transfer apparatus, and shorten the time required for a wire routing design and reduce the number of manufacturing processes.

It is further preferable that the plurality of motors include a motor for turning the hand relative to the base.

This configuration eliminates the need for a power line and a signal line dedicated to a motor for turning the hand relative to the base. This makes it possible to simplify the wiring inside the transfer apparatus, and shorten the time required for a wire routing design and reduce the number of manufacturing processes.

It is also preferable that the plurality of motors include a motor for driving the arm mechanism.

This configuration eliminates the need for a power line and a signal line dedicated to a motor for driving the arm mechanism. This makes it possible to simplify the wiring inside the transfer apparatus, and shorten the time required for a wire routing design and reduce the number of manufacturing processes.

It is further preferable that the plurality of motors include a motor for rotating the hand relative to the arm mechanism.

This configuration eliminates the need for a power line and a signal line dedicated to a motor for rotating the hand relative to the arm mechanism. This makes it possible to simplify the wiring inside the transfer apparatus, and shorten the time required for a wire routing design and reduce the number of manufacturing processes.

Preferably, the transfer system further comprises a sensor for controlling the transfer apparatus, and the plurality of motors include at least one of a motor for raising or lowering the arm mechanism, a motor for turning the hand relative to the base, a motor for driving the arm mechanism and a motor for rotating the hand relative to the arm mechanism, and the power cable includes a first power line that transmits electric power for driving the motor and a second power line that transmits electric power for operating the drive control section, and the internal power line includes a third power line that transmits electric power for driving the motor and a fourth power line that transmits electric power for operating the drive control section, and the plurality of drive control sections each comprises a driving circuit board having a plurality of first power terminals to which the first power line or the third power line is connected, the first power terminals being electrically connected to each other, and a communication circuit board having a plurality of second power terminals to which the second power line or the fourth power line is connected, the second power terminals being electrically connected to each other, and the plurality of driving circuit boards and the plurality of communication circuit boards are ones manufactured from a standardized circuit board, and the first power terminals included in the respective drive control sections have the same shape, and the second power terminals included in the respective drive control sections have the same shape, the control device and one of the drive control sections sends and receives a signal for controlling the transfer apparatus and a signal output from the sensor through the second power line, and the plurality of drive control sections are connected in series by the internal power line, and send and receive a signal for controlling the transfer apparatus and a signal output from the sensor through the fourth power line.

According to the above-described configuration, it is possible to produce the effects described above and to shorten the time required for a wire routing design in the transfer apparatus and reduce the number of manufacturing processes.

A transfer apparatus according to one aspect of the present disclosure comprises: an arm mechanism having a hand for holding a workpiece and being rotatably supported to a base; a plurality of motors for driving the transfer apparatus; a plurality of drive control sections that apply electric power supplied from an external control device to the plurality of motors for driving the motors; and an internal power line that connects between the plurality of drive control sections and transmits electric power supplied from the control device, and each drive control section sends and receives a signal applied from the control device to and from another one of the drive control sections and supplies electric power responsive to the signal to the motor, through the internal power line.

Regardless of an increase in the number of motors and drive control sections that constitute the transfer apparatus, the number of electrical lines connecting between the transfer apparatus and the control device can be reduced. This shortens the time required for a wire routing design inside the transfer apparatus and reduces the number of manufacturing processes.

It is also preferable that the transfer apparatus further comprises a sensor for controlling the transfer apparatus, and the plurality of motors include at least one of a motor for raising or lowering the arm mechanism, a motor for turning the hand relative to the base, a motor for driving the arm mechanism and a motor for rotating the hand relative to the arm mechanism, and the internal power line includes a third power line that transmits electric power for driving the motor and a fourth power line that transmits electric power for operating the drive control section, and the plurality of drive control sections each comprises a driving circuit board having a plurality of first power terminals to which a first power line that connects the transfer apparatus to the control device and transmits power for driving the motor or the third power line is connected, the first power terminals being electrically connected to each other, and a communication circuit board having a plurality of second power terminals to which a second power line that connects the transfer apparatus to the control device and transmits electric power to operate the drive control section or the fourth power line is connected, the second power terminals being electrically connected to each other, and the plurality of driving circuit boards and the plurality of communication circuit boards are ones manufactured from a standardized circuit board, and the first power terminals included in the respective drive control sections have the same shape, and the second power terminals included in the respective drive control sections have the same shape, and the plurality of drive control sections are connected in series by the internal power lines, and send and receive signals for controlling the transfer apparatus and a signal output from the sensor through the fourth power line.

According to the above-described configuration, it is possible to produce the effects described above and to shorten the time required for a wire routing design in the transfer apparatus and reduce the number of manufacturing processes.

A module according to one aspect of the present disclosure comprises: a drive control section that applies electric power supplied from an external control device to a motor for driving a transfer apparatus provided with an arm mechanism having a hand for holding a workpiece and being rotatably supported to a base for driving the motor; and a plurality of power terminals to which internal power lines for transmitting electric power supplied from the control device are to be connected, and the plurality of power terminals are electrically connected to each other, and the drive control section sends and receives signals for controlling motions of the transfer apparatus to and from the control device and another external module and supplies electric power responsive to the signals to the motor, through the internal power lines.

With simple processes of providing a module for the transfer apparatus and connecting the module to another module through an internal power line, the transfer apparatus can be assembled.

It is further preferable that the plurality of power terminals include a plurality of first power terminals to which a first power line that connects the module to the control device to thereby transmit power for driving the motor or a third power line that connects the module to another module to thereby transmit electric power for driving the motor is to be connected, and a plurality of second power terminals to which a second power line that connects the module to the control device to thereby transmit electric power for operating the drive control section or a fourth power line that connects the module to another module to thereby transmit electric power for operating the drive control section is to be connected, the module further comprising: a driving circuit board provided with the plurality of first power terminals, and a communication circuit board provided with the plurality of second power terminals, and the plurality of first power terminals have the same shape and are electrically connected to each other, and the plurality of second power terminals have the same shape and are electrically connected to each other.

According to the above-described configuration, it is possible to produce the effects described above and to shorten the time required for a wire routing design in the transfer apparatus and reduce the number of manufacturing processes.

It is noted that each of the above-described configurations or a part of the configuration may be arbitrarily combined to form the transfer system, the transfer apparatus and the module.

Hereinafter, embodiments of the present disclosure will be described in detail with reference to the drawings.

Embodiment 1

Figure 2:
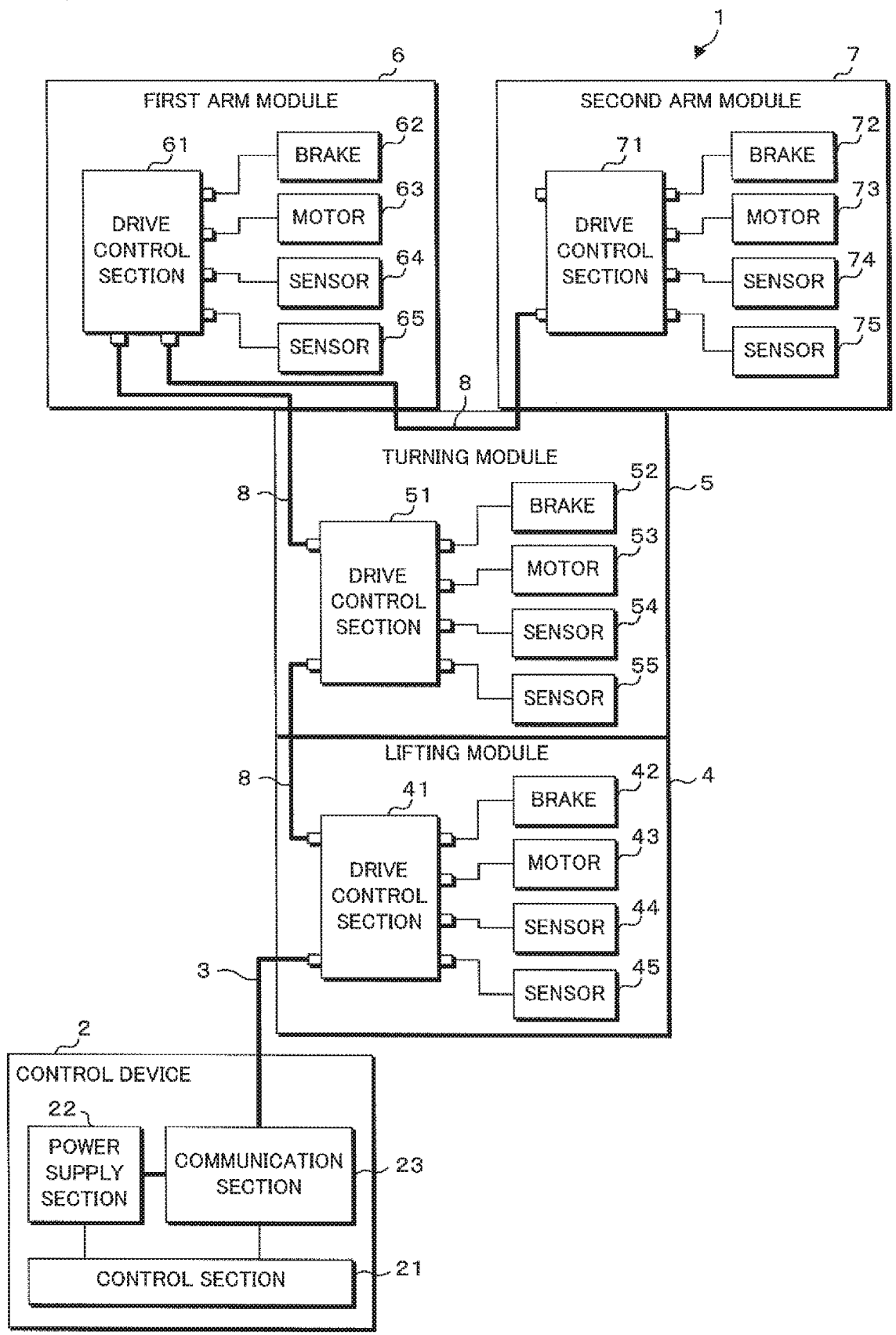
FIG. 2 is a block diagram illustrating the transfer system according to Embodiment 1.

FIG. 1 is a schematic diagram illustrating a transfer system according to Embodiment 1, and FIG. 2 is a block diagram illustrating the transfer system according to Embodiment 1. The transfer system includes a transfer apparatus 1, a control device 2 that supplies electric power to the transfer apparatus 1 and controls the motions of the transfer apparatus 1, and a power cable 3 that connects between the transfer apparatus 1 and the control device 2. The transfer apparatus 1 is a transfer robot, for example.

The transfer system according to Embodiment 1 enables the ease of assembly by combining units designed in modules each having a function concentrated for each driving shaft of the transfer apparatus 1, and enables flexible adaptation to an addition of a unit and a request for customizing by a daisy chain connection between the modules.

The transfer apparatus 1 is provided with a base 11 installed in a predetermined position, a first arm mechanism 12 and a second arm mechanism 13 each having one end being rotatably supported to the base 11, and a first hand 14 and a second hand 15 that are rotatably supported to the other ends of the first arm mechanism 12 and the second arm mechanism 13, respectively.

The base 11 has a pole shape, for example, and is installed at a predetermined position while the long side is made vertical. The base 11 has a quadrangular pole part and a cylindrical part that protrudes from an upper end surface of the quadrangular pole part and is allowed to move in a vertical direction and rotate. The first arm mechanism 12 and the second arm mechanism 13 are supported to an upper end surface of the cylindrical part. The quadrangular pole part of the base 11 is provided with a lifting mechanism (not illustrated) that raises or lowers the cylindrical part together with the first arm mechanism 12 and the second arm mechanism 13, and a turning mechanism that turns the cylindrical part. The lifting mechanism is a ball screw mechanism, for example. The turning mechanism is a gear mechanism.

Two first shafts are provided at the upper end surface as axes for supporting the first arm mechanism 12 and the second arm mechanism 13 to the upper end surface such that the central axes thereof corresponds to the longitudinal direction of the base 11.

The first arm mechanism 12 is a linkage mechanism in which multiple arms are coupled to each other so as to rotate about rotation axes rotating in the same direction. The first arm mechanism 12 includes a plate-shaped lower arm and a plate-shaped upper arm, for example. One end of the lower arm is rotatably supported to the base 11 by the first shaft. The other end of the lower arm is provided with a second shaft for which the direction of the central axis is substantially the same as that of the first shaft. One end of the upper arm is rotatably supported to the other end of the lower arm by the second shaft. The lower arm and the upper arm are individually rotatable with respect to the base 11.

The lower arm and the upper arm of the first arm mechanism 12 thus configured can advance or retract with respect to the base 11 by turning on a plane substantially parallel to the installation surface of the base 11. The second arm mechanism 13 has a configuration similar to the first arm mechanism 12.

Each of the first hand 14 and the second hand 15 is in the form of a U-shaped plate of substantially the same shape when viewed in plan, for example, that is composed of a base portion to be attached to the upper arm and a two-finger portion extending from the base portion and bifurcating in a direction substantially parallel to the installation surface of the base 11. Moreover, the first hand 14 and the second hand 15 are provided with holding portions (not illustrated) that holds a workpiece. The holding portion is a vacuum chuck, or an edge grip chuck which grips the edge of a workpiece, for example. It is noted that the shapes of the first hand 14 and the second hand 15 are not limited to a particular shape and may take different shapes. The other end of the upper arm of the first arm mechanism 12 is provided with a first hand shaft having the central axis extending in a direction substantially the same as that of the first shaft, and the base portion of the first hand 14 is rotatably supported to the other end of the upper arm by the first hand shaft. Similarly, the second hand 15 is rotatably supported to the other end of the upper arm of the second arm mechanism 13.

The first hand 14 and the second hand 15 thus configured are rotatable together with the first arm mechanism 12 and the second arm mechanism 13 on the plane substantially parallel to the installation surface of the base 11.

As shown in FIG. 2, the transfer apparatus 1 is provided with a lifting module 4 that raises or lowers the base 11, a turning module 5 that turns the first hand 14 and the second hand 15 with respect to base 11, a first arm module 6 that drives the first arm mechanism 12, and a second arm module 7 that drives the second arm mechanism 13.

The lifting module 4 and the ball screw mechanism for raising or lowering the base 11 together constitute a lifting unit while the turning module 5 and the gear mechanism for rotating the base 11 together constitute a turning unit. The first arm module 6 and the first arm mechanism 12 constitute a first arm unit while the second arm module 7 and the second arm mechanism 13 constitute a second arm unit. The lifting module 4, the turning module 5, the first arm module 6 and the second arm module 7 are connected in series by internal power lines 8.

The manufacturer can assemble the transfer apparatus 1 by appropriately combining the units and connecting the modules via the internal power lines 8.

It is noted that each module is not necessarily disposed in the same housing as the corresponding unit. For example, a drive control section 61, a brake 62 and a motor 63 that constitute the first arm module 6 are disposed at the cylindrical part of the base 11 without being disposed in the first arm mechanism 12 while sensors 64 and 65 that constitute the first arm module 6 are disposed in the first arm mechanism 12. Here, an output from the motor 63 is transmitted to the first arm mechanism 12 via a mechanical transmission mechanism.

Similarly, a drive control section 71, a brake 72 and a motor 73 that constitute the second arm module 7 are disposed at the cylindrical part of the base 11 without being disposed in the second arm mechanism 13 while sensors 74 and 75 that constitute the second arm module 7 are disposed in the second arm mechanism 13.

Each module can be disposed at an appropriate position in conformity with the structure of the transfer apparatus 1, and the configuration is not limited to the above description.

The lifting module 4 is provided with a motor 43 for driving the ball screw mechanism to raise or lower the base 11, a brake 42 for securing the rotation mechanism of the motor 43 to avoid raising or lowering of the base 11 by an external force, various sensors 44 and 45, and a drive control section 41 for communicating with the control device 2 and applying electric power supplied from the control device 2 to the motor 43 for driving it. The drive control section 41 retrieves a signal from the sensor 44 or the like as necessary.

The sensor 44 is a sensor for restricting the raising or lowering range, for example, and outputs a signal when the cylindrical part of the base 11 reaches the limit of the raising or lowering range. Furthermore, devices connected to the drive control section 41 need not to be limited to the sensors, but any device such as a pneumatic device may be connected to the drive control section 41 as necessary. It is noted that the brake 42 and the various sensors 44 and 45 may be provided as necessary.

The turning module 5 is provided with a motor 53 for turning the first hand 14 and the second hand 15 by rotating the cylindrical part of the base 11 together with the first arm mechanism 12 and the second arm mechanism 13, a brake 52 for securing the rotation mechanism of the motor 53, various sensors 54 and 55, and a drive control section 51 for applying electric power supplied from the control device 2 to the motor 53 for driving it. The sensor 54 is a sensor for restricting the turning range, for example. It is noted that the brake 52 as well as the various sensors 54 and 55 may be provided as necessary.

The first arm module 6 is provided with the motor 63 for rotating the joint of the first arm mechanism 12, the brake 62 for securing the rotation mechanism of the motor 63, the various sensors 64 and 65, and the drive control section 61 for applying electric power supplied from the control device 2 to the motor 63 for driving it. The sensor 64 is a sensor for restricting the moving range of the first arm mechanism 12, and the sensor 65 is a workpiece sensor for detecting a workpiece held by the first hand 14. It is noted that the sensors 64 and 65 are one example of devices to be connected to the drive control section 61, and any device such as a solenoid valve to control sucking and holding of a workpiece may be connected to the drive control section 61. Furthermore, the brake 62 and the various sensors 64 and 65 may be provided as necessary.

The second arm module 7 is provided with the motor 73 for rotating the joint of the second arm mechanism 13, the brake 72 for securing the rotation mechanism of the motor 73, the various sensors 74 and 75, and the drive control section 71 for applying electric power supplied from the control device 2 to the motor 73 for driving it. The sensor 74 is a sensor for restricting the moving range of the second arm mechanism 13, and the sensor 75 is a sensor for detecting a workpiece held by the second hand 15. It is noted that the brake 72 and the various sensors 74 and 75 may be provided as necessary.

The control device 2 is provided with a control section 21 for controlling the operation of each section in the control device 2. The control section 21 is a microcomputer including a central processing unit (CPU), a read only memory (ROM), a random access memory (RAM), an input-output interface and so forth, and is connected with a power supply section 22 and a communication section 23.

The control section 21 sends and receives a signal necessary to control the motions of the transfer apparatus 1 through the communication section 23. More specifically, the control section 21 sends signals for controlling the rotation of the motors 43, 53, 63 and 73 of the respective modules to the transfer apparatus 1 through the communication section 23. In addition, the control section 21 receives a signal sent from the transfer apparatus 1 via the communication section 23, and confirms the state of the transfer apparatus 1 based on the received signal.

The power supply section 22 is provided with a main power supply 22a for outputting electric power to the motors 43, 53, 63 and 73 of the respective modules and a control power supply 22b for outputting electric power to operate the respective drive control sections 41, 51, 61 and 71. The power cable 3 includes a first power line 3a that transmits electric power for driving the motors 43, 53, 63 and 73 and a second power line 3b that transmits electric power for operating the drive control sections 41, 51, 61 and 71. The electric power output from the main power supply 22a is supplied to the transfer apparatus 1 through the first power line 3a, and the electric power output from the control power supply 22b is supplied to the transfer apparatus 1 through the communication section 23 and the second power line 3b.

The control device 2 can be disposed in the same housing as the transfer apparatus 1. In this case, the power cable 3 is disposed in the same housing as the transfer apparatus 1.

The communication section 23 is connected to the control power supply 22b of the power supply section 22. The communication section 23 modulates a signal applied from the control section 21 and superimposes the modulated signal onto the electric power output from the control power supply 22b to thereby send the signal through a power line to the transfer apparatus 1. Additionally, the communication section 23 demodulates the signal sent through the second power line 3b from the transfer apparatus 1, and applies the demodulated signal to the control section 21. The signals sent from the transfer apparatus 1 are signals indicative of detection results from the various sensors 44, 45 and so on. The power line communication performed by the communication section 23 is a high-speed power line communication (PLC) in the range of 2-30 MHz, for example.

The relationship of connection between the power supply section 22 and each of the drive control sections 41, 51, 61 and 71 is described.

Figure 5:
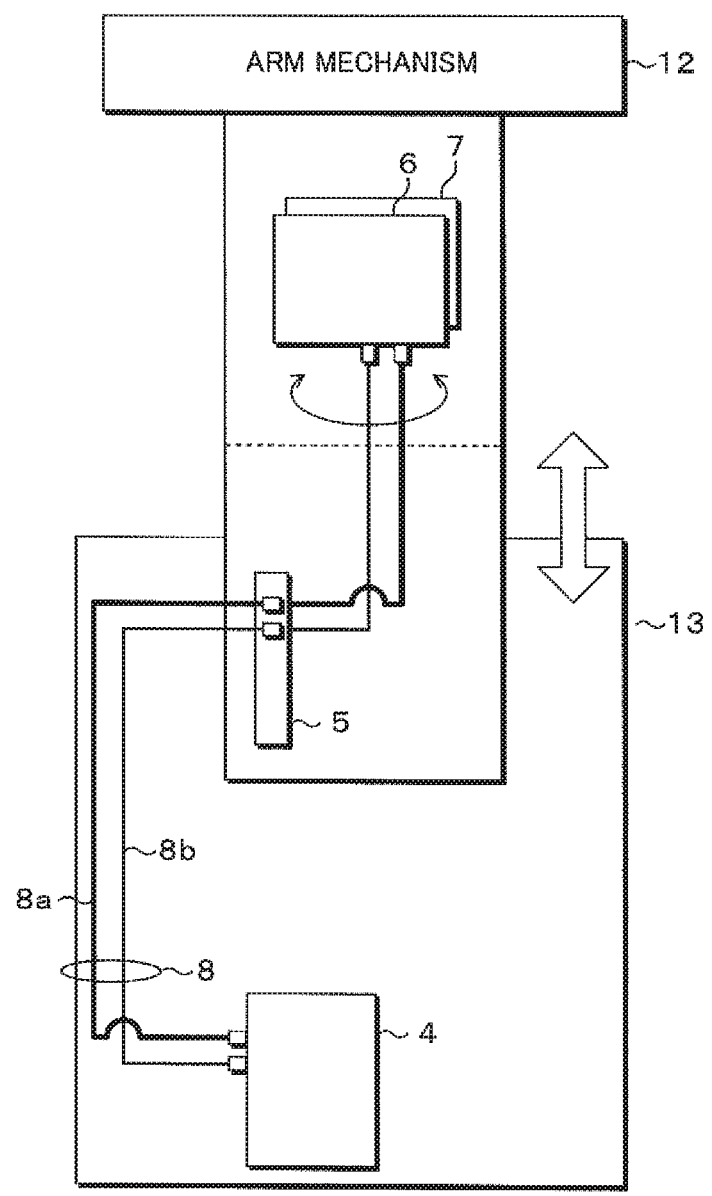
FIG. 5 is a schematic view illustrating an arrangement of modules.

The power supply section 22 is connected to the drive control section 41 of the lifting module 4 via the communication section 23 through the power cable 3, and the drive control section 41 is connected to the drive control section 51 of the turning module 5 through an internal power line 8. Similarly to the power cable 3, the internal power line 8 includes a third power line 8a that transmits electric power for driving the motors 43, 53, 63 and 73 and a fourth power line 8b that transmits electric power for operating the drive control sections 41, 51, 61 and 71 as shown in FIG. 5. The other internal power lines 8 connecting between the drive control sections 51, 61 and 71 have a similar configuration. The drive control section 41 is operated by the electric power supplied from the power supply section 22. Furthermore, the electric power supplied from the power supply section 22 is supplied to the adjacent drive control section 51 via the drive control section 41 and the internal power line 8.

The drive control section 51 is connected with the drive control section 41 of the lifting module 4 and the drive control section 61 of the first arm module 6 by the internal power lines 8. The drive control section 51 is operated by the electric power supplied from the power supply section 22 via the drive control section 41 of the lifting module 4. Furthermore, the electric power supplied from the power supply section 22 is supplied to the drive control section 61 via the drive control sections 41 and 51 and the internal power lines 8.

The drive control section 61 is connected with the drive control section 51 of the turning module 5 and the drive control section 71 of the second arm module 7 via the internal power lines 8. The drive control section 61 is operated by the electric power supplied from the power supply section 22 via the drive control section 51 of the turning module 5. The electric power supplied from the power supply section 22 is supplied to the drive control section 71 via the drive control sections 41, 51 and 61 and the internal power lines 8.

The drive control section 71 is connected to the drive control section 61 of the first arm module 6 by the internal power line 8. The drive control section 71 is operated by the electric power supplied from the power supply section 22 via the drive control section 61 of the first arm module 6.

Hence, the drive control sections 41, 51, 61 and 71 are connected in series by the internal power lines 8.

Moreover, each of the drive control sections 41, 51, 61 and 71 sends a signal for controlling the transfer apparatus 1 through the fourth power lines 8b. Each of the drive control sections 41, 51, 61 and 71 sends and receives a signal via a high-speed PLC employing 2-30 MHz, for example. More specifically, each of the drive control sections 41, 51, 61 and 71 interrupts a power component, demultiplexes the signal sent from the transfer apparatus 1 through a power line, demodulates the demultiplexed signal, and supplies electric power responsive to the demodulated signal to each of the motors 43, 53, 63 and 73. Meanwhile, each of the drive control sections 41, 51, 61 and 71 modulates a signal indicating detection results from the sensors 44, 45 and so on and superimposes the modulated signal onto the electric power to thereby send the signal to the control device 2 via the electrical line. Furthermore, each of the drive control sections 41, 51, 61 and 71 is assigned an identifier for identifying the individual drive control sections 41, 51, 61 and 71. The control section 21 can separately communicate with each of the drive control sections 41, 51, 61 and 71 by the identifier.

Figure 3:
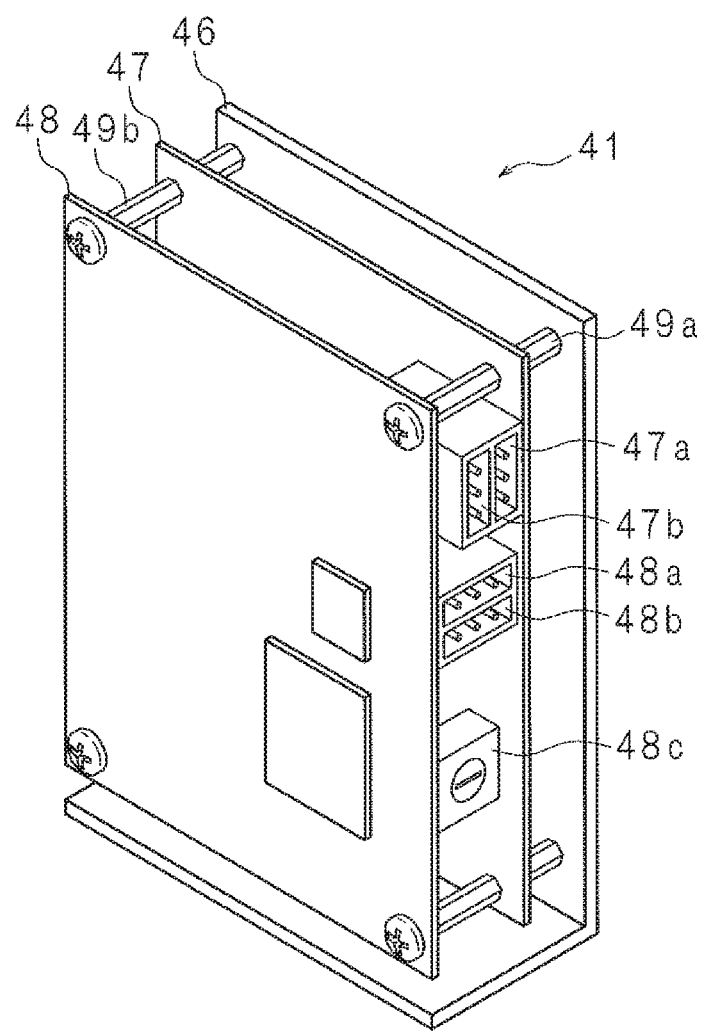
FIG. 3 is a perspective view schematically illustrating a drive control section of a lifting module.
Figure 4:
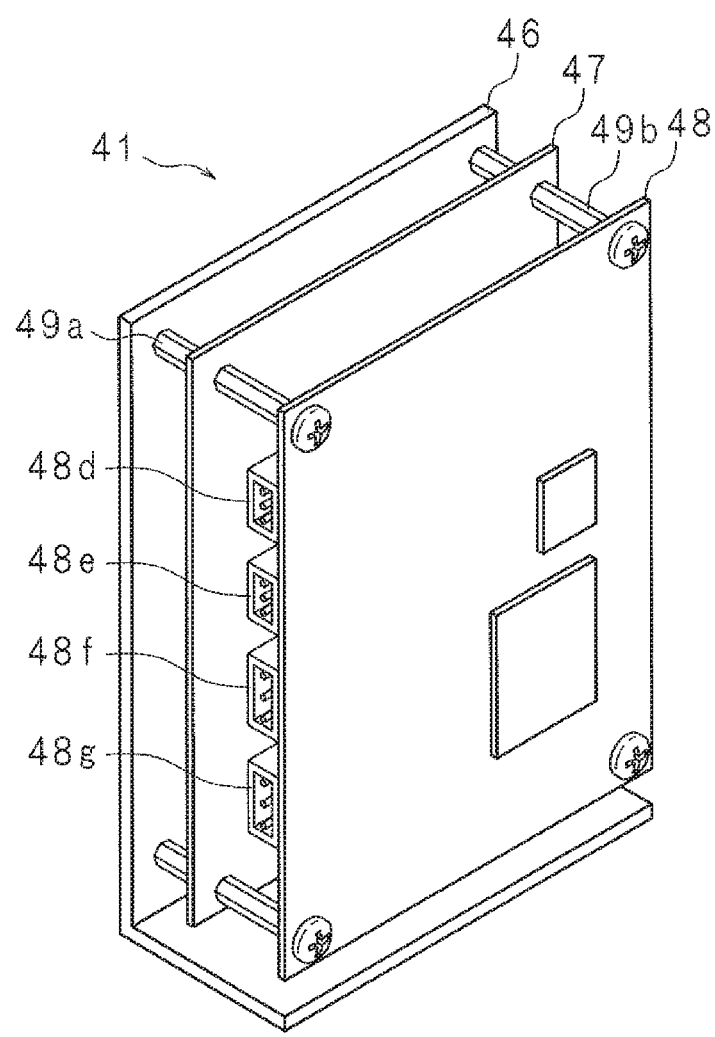
FIG. 4 is a perspective view schematically illustrating the drive control section of the lifting module.

FIG. 3 and FIG. 4 are perspective views schematically illustrating the drive control section 41 of the lifting module 4. The lifting module 4 is composed of a driving circuit board 47 on which circuit elements for driving the motor 43 are arranged, a communication circuit board 48 on which circuit elements for sending and receiving signals and controlling the motor 43 are arranged, and a support 46 for supporting the driving circuit board 47 and the communication circuit board 48. The support 46 is in the form of an L-shaped plate made of metal that is composed of a rectangular support board having substantially the same dimension as the driving circuit board 47 and a securing board extending from a short side of the support board to secure the support 46 at a predetermined position.

The driving circuit board 47 and the communication circuit board 48 are supported to the support 46. More specifically, the driving circuit board 47 is supported to the support board by four pillars 49a provided at the four corners of the support board such that it is opposed to the support board with a gap. In addition, the communication circuit board 48 is supported to the support board by four pillars 49b provided at the four corners of the support board such that it is opposed to the driving circuit board 47 with a gap.

The driving circuit board 47 is rectangular, and is provided with two first power terminals 47a and 47b at one of the long sides thereof, to which the first power line 3a and the third power line 8a are respectively connected. In this embodiment, the one first power terminal 47a is connected with one end of the first power line 3a that is connected to the control device 2 at the other end, and the other first power terminal 47b is connected with the one end of the third power line 8a. The first power terminals 47a and 47b are electrically connected to each other, so that the electric power supplied to the first power terminal 47a through the first power line 3a is supplied to the drive control section 51 through the third power line 8a. The electric power supplied from the first power line 3a to the first power terminal 47a is configured to be supplied to the motor 43 via a motor terminal 48e described later.

The communication circuit board 48 is also rectangular similarly to the driving circuit board 47, and is provided with two second power terminals 48a and 48b at one of the long sides thereof to which the second power line 3b and the fourth power line 8b are respectively connected. That is, the first power terminals 47a and 47b as well as the second power terminals 48a and 48b are provided at the same long side.

The second power terminals 48a and 48b are electrically connected to each other, so the power input to the second power terminal 48a through the second power line 3b is supplied to the drive control section 51 through the fourth power line 8b.

Furthermore, the communication circuit board 48 is provided with a dial switch 48c for setting identifiers of the drive control section 41, 51, 61 and 71 at the one long side thereof.

As illustrated in FIG. 4, the communication circuit board 48 is provided, at the other one of the long sides, with a brake terminal 48d to which the brake 42 is connected, a motor terminal 48e to which the motor 43 is connected, two input/output terminals 48f and 48g to which the sensors 44 and 45 are connected.

Each of the turning module 5, the first arm module 6 and the second arm module 7 has a configuration similar to the lifting module 4, and is composed of a driving circuit board, a communication circuit board and a support. The driving circuit board is provided with two first power terminals, and the communication circuit board is provided with two second power terminals, similarly to the lifting module 4. The first power terminals included in the respective drive control section 41, 51, 61 and 71 have the same shape. The second power terminals included in the respective drive control sections 41, 51, 61 and 71 have the same shape. This makes it possible to standardize the drive control sections 41, 51, 61 and 71 across the respective units.

FIG. 5 is a schematic view illustrating an arrangement of the respective modules. The lifting module 4 is secured at the lower part of the quadrangular pole part of the base 11 such that the long side thereof is made vertical. The turning module 5 is secured at the lower part of the cylindrical part of the base 11 such that the long side thereof is made vertical. The internal power line 8 connecting between the lifting module 4 and the turning module 5 is routed along the corners and the sides of the quadrangular pole part of the base 11. Furthermore, the first arm module 6 and the second arm module 7 are secured inside the cylindrical part of the base 11 such that the long side thereof is made horizontal.

Figure 6:
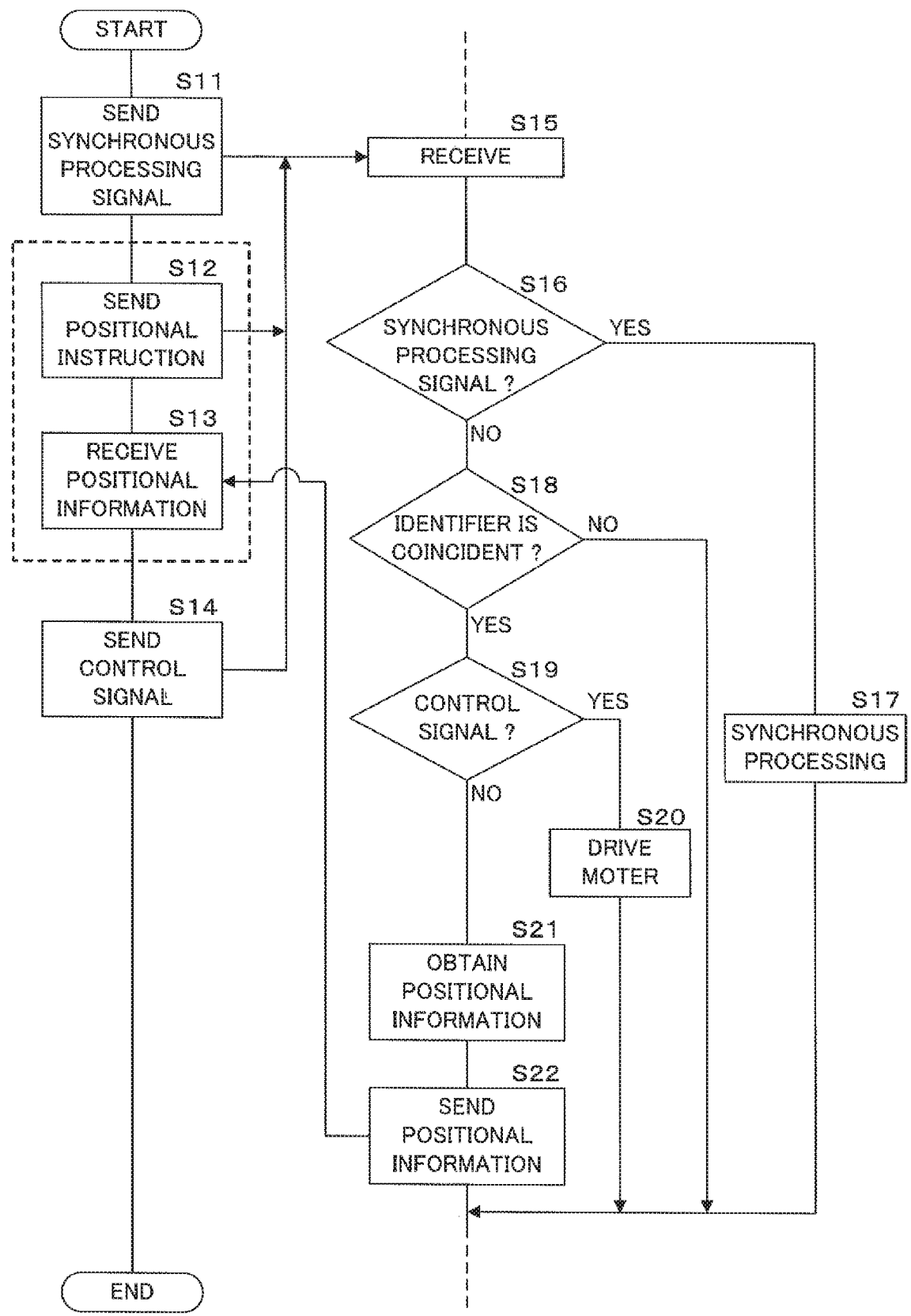
FIG. 6 is a flowchart illustrating a procedure performed by a control device and the drive control section.

FIG. 6 is a flowchart illustrating a procedure by the control device 2 and each of the drive control sections 41, 51, 61 and 71. The processing details by the control device 2 and the transfer apparatus 1 are described in turn. The control section 21 of the control device 2 sends a synchronous processing signal to each of the drive control sections 41, 51, 61 and 71 of the transfer apparatus 1 via the second power line 3b and the fourth power line 8b (step S11). Furthermore, the control section 21 sends to each of the drive control sections 41, 51, 61 and 71 a positional instruction to request the positional information of the first hand 14 and the second hand 15 through the second power line 3b and the fourth power line 8b (step S12), and receives the positional information sent from the transfer apparatus 1 in response to the positional instruction (step S13).

The processing at steps S12 and S13 surrounded by dashed lines is executed for each of the drive control sections 41, 51, 61 and 71. In the present embodiment, the processing at steps S12 and S13 is executed for the drive control section 41. More specifically, the control device 2 sends to the transfer apparatus 1 a positional instruction to request the positional information indicating the rotation angle of the motor 43 through the second power line 3b and the fourth power line 8b. The positional instruction includes the identifier corresponding to the lifting module 4. Then, the control section 21 receives the positional information sent from the drive control section 41. Similarly to the above description, the control section 21 executes the processing at steps S12 and S13 for each of the drive control sections 51, 61 and 71. The control section 21 sends to the transfer apparatus 1 a positional instruction to request the positional information indicating the rotation angle of each of the motors 53, 63 and 73. The positional instruction includes the identifier corresponding to each of the turning module 5, the first arm module 6 and the second arm module 7. The control section 21 receives the positional information sent from each of the drive control sections 51, 61 and 71. The control section 21 can confirm the current position and orientation of the first hand 14 and the second hand 15 based on the received positional information.

The control section 21 then sends to each of the drive control sections 41, 51, 61 and 71 a control signal to move the first hand 14 and the second hand 15 from the current position to a specific position through the second power line 3b and the fourth power line 8b (step S14). More specifically, the control device 2 sends to the transfer apparatus 1 a control signal including an identifier corresponding to the lifting module 4 to control the rotation of the motor 43 through the second power line 3b and the fourth power line 8b. Similarly, the control device 2 sends to the transfer apparatus 1 a control signal including an identifier corresponding to each of the turning module 5, the first arm module 6 and the second arm module 7 to control the rotation of each of the motors 53, 63 and 73.

The following describes the processing by the transfer apparatus 1. Each of the drive control sections 41, 51, 61 and 71 receives various signals sent from the control device 2 (step S15), and determines whether or not the received signal is a synchronous processing signal (step S16). If it is determined that the received signal is a synchronous processing signal (YES at step S16), each drive control section 41, 51, 61 and 71 executes synchronous processing by the synchronous processing signal (step S17).

If it is determined the received signal is a synchronous processing signal (NO at step S16), it is determined whether or not the identifier included in the signal is coincident with its own identifier (step S18). If it is determined that the identifiers are not coincident with each other (NO at step S18), each of the drive control sections 41, 51, 61 and 71 ends the processing.

If it is determined that the identifiers are coincident with each other (YES at step S18), each of the drive control sections 41, 51, 61 and 71 determines whether or not the received signal is a control signal (step S19). If it is determined the received signal is a control signal (YES at step S19), each of the drive control sections 41, 51, 61 and 71 applies electric power responsive to the received control signal to thereby rotate each of the motors 43, 53, 63 and 73 (step S20). By the driving processing by each of the motors 43, 53, 63 and 73, the first hand 14 and the second hand 15 are moved to the indicated position.

If it is determined the signal received at step S19 is not a control signal (NO at step S19), that is, if it is determined that the received signal is a positional instruction, each of the drive control sections 41, 51, 61 and 71 obtains the positional information indicating a driven position from an encoder included in each of the motors 43, 53, 63 and 73 of the transfer apparatus 1 (step S21). Each motor 43, 53, 63 or 73 of the transfer apparatus 1 is provided with an encoder for detecting a rotation angle, and each encoder outputs information indicating a detected rotation angle to each of the drive control sections 41, 51, 61 and 71. Each of the drive control sections 41, 51 61 and 71 receives the positional information obtained from the encoder. Each of the drive control sections 41, 51 61 and 71 then sends the obtained positional information indicating the position to the control device 2 through the fourth power line 8b and the second power line 3b (step S22). It is noted that the control device 2 receives at step S13 the positional information sent from the transfer apparatus 1 at step S22.

The above-described processing exemplifies processing for moving the first hand 14 and the second hand 15. The control device 2 can similarly control other motions of the transfer apparatus 1. That is, the control device 2 sends and receives various signals including an identifier of each module to and from the drive control sections 41, 51, 61 and 71 through the power cable 3 and internal power lines 8 to thereby control the motions of the transfer apparatus 1.

By combining the units including the modules each having a function concentrated for each driving shaft of the transfer apparatus 1, the transfer system as well as the transfer apparatus 1 and the various modules that are thus configured can facilitate the manufacturing of the transfer apparatus 1 having a required function, which shortens the time required for a wire routing design in the transfer apparatus 1 and reduces the number of manufacturing processes.

This structure enables manufacturing of a transfer system complying with a particular requirement specification in short delivery times. Furthermore, a flexible adaptation to a request for an addition of the drive parts, attachment of sensors or the like is made possible. In addition, reduction in the number of electrical lines routed in the transfer apparatus 1 prevents a malfunction such as disconnection in the movable part.

Furthermore, the transfer apparatus 1 and the control device 2 are configured to send and receive control signals through the second power line 3b and the fourth power lines 8b. This enables monitoring of the various sensors 44, 45 and so on by the control device 2 in a state the electric power supply to the motors 43, 53, 63, and 73 are suspended.

It is noted that, in this embodiment, one motor is connected to one drive control section, but two or more motors can also be connected to one drive control section for controlling the motors. Depending on the structure of a module, it is desirable to connect two motors to one drive control section. Thus, such a configuration is also made possible.

In addition, the drive control sections 41, 51, 61 and 71 of the various modules that constitute the transfer apparatus 1 can be connected in series or parallel. This enables reduction in the number of the internal power lines 8.

Furthermore, since at least the drive control sections 41, 51, 61 and 71 are standardized among the units, when any unit provided with a drive control section is added, a required transfer apparatus can be assembled by merely preparing a similar drive control section and connecting the drive control section with the drive control sections 41, 51, 61 and 71 through the internal power lines 8.

Additionally, the commonality of the drive control sections 41, 51, 61 and 71 can reduce manufacturing costs.

In addition, signals from the various sensors 44, 45 and so on are sent and received through the second power line 3b and the fourth power line 8b. This eliminates the need for a signal line dedicated to a sensor and thus simplifies the wiring in the transfer apparatus 1, which shortens the time required for a wire routing design and reduces the number of manufacturing processes.

Embodiment 2

The transfer system according to Embodiment 2 is different from that of Embodiment 1 in that an inversion axis module 9 is further provided. Thus, only the difference is described below while parts corresponding to Embodiment 1 are denoted by similar reference codes and the detailed description thereof will not be repeated.

Figure 7:
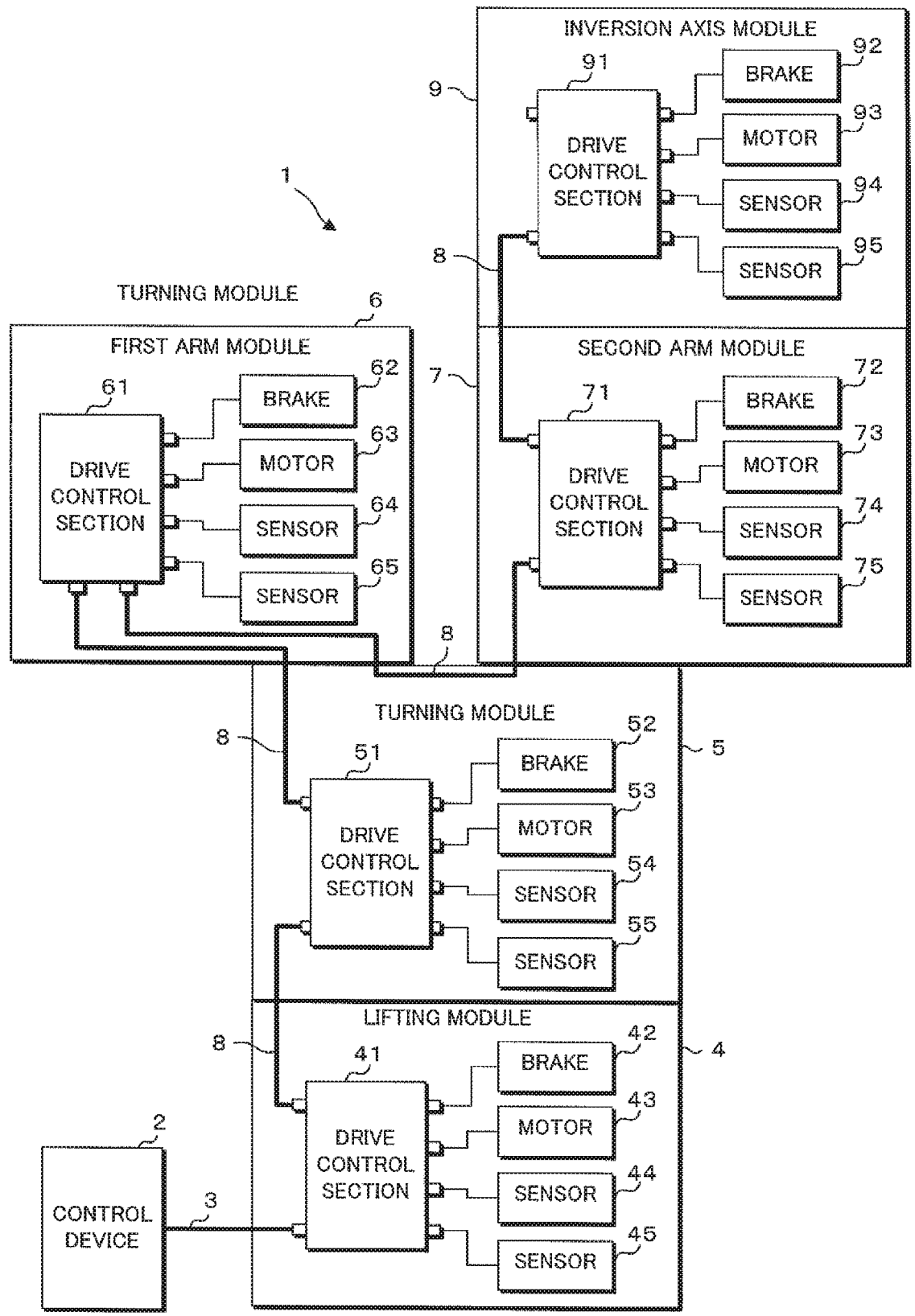
FIG. 7 is a block diagram illustrating a transfer system according to Embodiment 2.

FIG. 7 is a block diagram illustrating a transfer system according to Embodiment 2. The transfer system according to Embodiment 2 is provided with the transfer apparatus 1 and the control device 2 similarly to Embodiment 1. The transfer apparatus 1 is provided with the inversion axis module 9 that rotates the second hand 15 about a rotational axis along the long side of the distal arm that configures the second arm mechanism 13. The inversion axis module 9 is provided with a drive control section 91, a brake 92, a motor 93 and various sensors 94 and 95 similarly to the other modules.

The drive control section 91 is connected to the drive control section 71 of the second arm module 7 through the internal power line 8. In other words, the drive control section 91 is connected in series with the drive control sections 41, 51, 61 and 71 of the respective modules. The drive control section 91 is operated by electric power supplied from the power supply section 22 via the drive control section 71 of the second arm module 7.

Furthermore, the drive control section 91 communicates a signal for controlling the transfer apparatus 1 through the fourth power line 8b. Furthermore, the drive control section 91 modulates a signal indicating detection results from the sensors 94 and 95 and superimposes the modulated signal onto the electric power to thereby send the signal to the control device 2 via the electrical line.

The transfer system thus configured enables an addition of the inversion axis module 9 to the transfer apparatus 1 by merely connecting the drive control section 91 of the inversion axis module 9 in series with the drive control section 71 of the second arm module 7.

Embodiment 3

The transfer system according to Embodiment 3 is different from that of Embodiment 1 in that a rotation module 10 is further provided and multiple power supply connectors are provided. Thus, only the differences are described below, while parts corresponding to Embodiment 1 are denoted by similar reference codes and the detailed description thereof will not be repeated.

Figure 8:
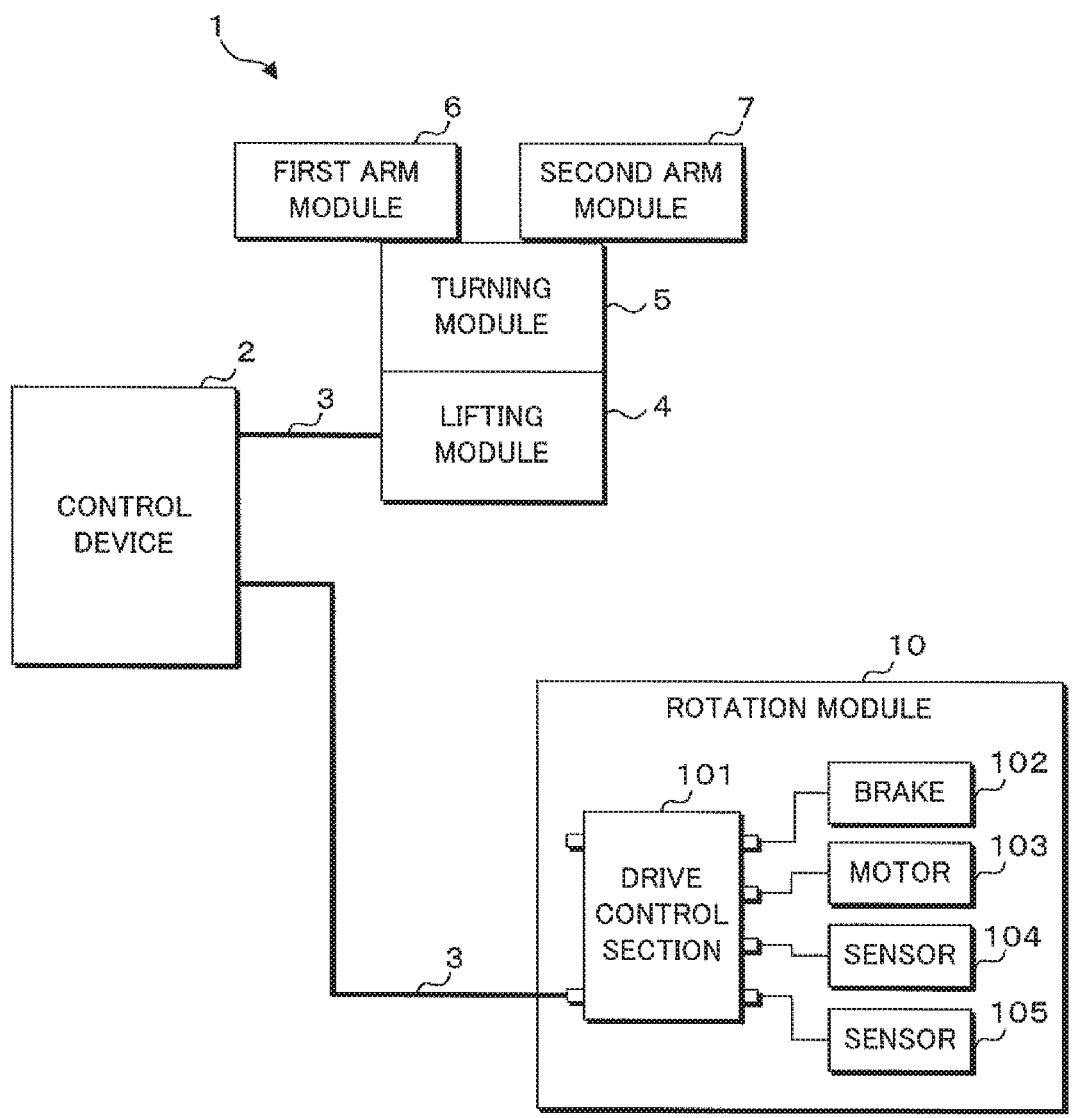
FIG. 8 is a block diagram illustrating a transfer system according to Embodiment 3.

FIG. 8 is a block diagram illustrating a transfer system according to Embodiment 3. The transfer system according to Embodiment 3 is provided with the transfer apparatus 1 and the control device 2 similarly to Embodiment 1. The transfer system is further provided with the rotation module 10. The rotation module 10 is configured to form a unit for rotating the stage of the aligner that performs centering and notch positioning of a workpiece such as a semiconductor wafer. The control device 2 is provided with two pairs of power supply connectors for outputting the electric power from the main power supply 22a and the control power supply 22b. One of the power supply connector pairs is connected with the transfer apparatus 1, and the other one of the power supply connector pairs is connected with the rotation module 10 by the power cable 3.

The rotation module 10 is provided with a drive control section 101, a brake 102, a motor 103 and various sensors 104 and 105 similarly to the other modules.

The drive control section 101 is connected to the communication section 23 and the power supply section 22 via the power cable 3. The power cable 3 connecting between the control device 2 and the rotation module 10 includes the first power line 3*a* and the second power line 3*b* similarly to Embodiment 1. The drive control section 101 is operated by the electric power supplied from the power supply section 22 via the communication section 23.

The drive control section 101 communicates a signal for controlling the movement of a rotation mechanism of the aligner by means of the fourth power line 8*b*. Furthermore, the drive control section 101 modulates a signal indicating detection results from the sensors 104 and 105 and superimposes the modulated signal onto the electric power to thereby send the signal to the control device 2 via the electrical line.

The transfer system thus configured allows modules in various systems to be connected in multidrop to the respective power terminals included in the control device 2. For example, the control device 2 can be connected in parallel with a system in which multiple modules that constitute the transfer apparatus 1 are connected in series and a system including the rotation module 10.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims

What is claimed is:

1. A transfer system, comprising:
a transfer apparatus provided with an arm mechanism having a hand for holding a workpiece and being rotatably supported to a base;
a control device that supplies electric power to the transfer apparatus and controls motions of the transfer apparatus; and
a power cable that connects between the control device and the transfer apparatus,
wherein
the control device comprises
a communication section that sends and receives a signal for controlling the transfer apparatus through the power cable, and
the transfer apparatus comprises
a plurality of motors for driving the transfer apparatus,
a plurality of drive control sections that apply electric power supplied from the control device to the plurality of motors for driving the motors and
an internal power line that connects between the plurality of drive control sections and transmits electric power supplied from the control device, and
wherein
one of the drive control sections is connected to the control device by the power cable, and
each of the drive control sections sends and receives the signal to and from the control device and another one of the drive control sections through the power cable and the internal power line, and drives the motor according to the signal.

2. The transfer system according to claim 1, wherein the power cable includes
a first power line that transmits electric power for driving the motor and
a second power line that transmits electric power for operating the drive control section, and
the internal power line includes
a third power line that transmits electric power for driving the motor and
a fourth power line that transmits electric power for operating the drive control section,
wherein
the control device and the drive control section send and receive the signal through the second power line and the fourth power line.

3. The transfer system according to claim 2, wherein the drive control section comprises
a driving circuit board having a plurality of first power terminals to which the first power line or the third power line is connected, the first power terminals being electrically connected to each other, and
a communication circuit board having a plurality of second power terminals to which the second power line or the fourth power line is connected, the second power terminals being electrically connected to each other.

4. The transfer system according to claim 3, wherein the plurality of drive control sections are connected in series by the internal power line.

5. The transfer system according to claim 3, wherein the plurality of driving circuit boards and the plurality of communication circuit boards are ones manufactured from a standardized circuit board.

6. The transfer system according to claim 3, wherein the first power terminals included in the respective drive control sections have the same shape, and
the second power terminals included in the respective drive control sections have the same shape.

7. The transfer system according to claim 1, wherein the transfer apparatus is provided with a sensor for controlling the transfer apparatus, and
the drive control section sends a signal output from the sensor to the control device through the internal power line and the power cable.

8. The transfer system according to claim 1, wherein the plurality of motors include a motor for raising or lowering the arm mechanism.

9. The transfer system according to claim 1, wherein the plurality of motors include a motor for turning the hand relative to the base.

10. The transfer system according to claim 1, wherein the plurality of motors include a motor for driving the arm mechanism.

11. The transfer system according to claim 1, wherein the plurality of motors include a motor for rotating the hand relative to the arm mechanism.

12. The transfer system according to claim 1, further comprising:
a sensor for controlling the transfer apparatus,
wherein
the plurality of motors include at least one of a motor for raising or lowering the arm mechanism, a motor for turning the hand relative to the base, a motor for driving the arm mechanism and a motor for rotating the hand relative to the arm mechanism, wherein
the power cable includes
a first power line that transmits electric power for driving the motor and
a second power line that transmits electric power for operating the drive control section, and
the internal power line includes
a third power line that transmits electric power for driving the motor and
a fourth power line that transmits electric power for operating the drive control section,
wherein
the plurality of drive control sections each comprises
a driving circuit board having a plurality of first power terminals to which the first power line or the third power line is connected, the first power terminals being electrically connected to each other, and
a communication circuit board having a plurality of second power terminals to which the second power line or the fourth power line is connected, the second power terminals being electrically connected to each other, wherein
the plurality of driving circuit boards and the plurality of communication circuit boards are ones manufactured from a standardized circuit board, and the first power terminals included in the respective drive control sections have the same shape, and the second power terminals included in the respective drive control sections have the same shape,
the control device and one of the drive control sections sends and receives a signal for controlling the transfer apparatus and a signal output from the sensor through the second power line, and
the plurality of drive control sections are connected in series by the internal power line, and send and receive a signal for controlling the transfer apparatus and a signal output from the sensor through the fourth power line.

13. A transfer apparatus comprising:
an arm mechanism having a hand for holding a workpiece and being rotatably supported to a base;
a plurality of motors for driving the transfer apparatus;
a plurality of drive control sections that apply electric power supplied from an external control device to the plurality of motors for driving the motors; and
an internal power line that connects between the plurality of drive control sections and transmits electric power supplied from the control device, wherein
each drive control section sends and receives a signal applied from the control device to and from another one of the drive control sections and supplies electric power responsive to the signal to the motor, through the internal power line.

14. The transfer apparatus according to claim 13, further comprising a sensor for controlling the transfer apparatus, wherein
the plurality of motors include at least one of a motor for raising or lowering the arm mechanism, a motor for turning the hand relative to the base, a motor for driving the arm mechanism and a motor for rotating the hand relative to the arm mechanism, wherein
the internal power line includes a third power line that transmits electric power for driving the motor and
a fourth power line that transmits electric power for operating the drive control section,
wherein
the plurality of drive control sections each comprises
a driving circuit board having a plurality of first power terminals to which a first power line that connects the transfer apparatus to the control device and transmits power for driving the motor or the third power line is connected, the first power terminals being electrically connected to each other, and
a communication circuit board having a plurality of second power terminals to which a second power line that connects the transfer apparatus to the control device and transmits electric power to operate the drive control section or the fourth power line is connected, the second power terminals being electrically connected to each other, wherein
the plurality of driving circuit boards and the plurality of communication circuit boards are ones manufactured from a standardized circuit board, and the first power terminals included in the respective drive control sections have the same shape, and the second power terminals included in the respective drive control sections have the same shape, and
the plurality of drive control sections are connected in series by the internal power line, and send and receive signals for controlling the transfer apparatus and a signal output from the sensor through the fourth power line.

15. A module comprising:
a drive control section that applies electric power supplied from an external control device to a motor for driving a transfer apparatus provided with an arm mechanism having a hand for holding a workpiece and being rotatably supported to a base for driving the motor; and
a plurality of power terminals to which internal power lines for transmitting electric power supplied from the control device are to be connected, wherein
the plurality of power terminals are electrically connected to each other, and
the drive control section sends and receives signals for controlling motions of the transfer apparatus to and from the control device and another external module and supplies electric power responsive to the signals to the motor, through the internal power lines;
wherein the plurality of power terminals include
a plurality of first power terminals to which a first power line that connects the module to the control device to thereby transmit electric power for driving the motor or a third power line that connects the module to another module to thereby transmit electric power for driving the motor is to be connected, and
a plurality of second power terminals to which a second power line that connects the module to the control device to thereby transmit electric power for operating the drive control section or a fourth power line that connects the module to another module to thereby transmit electric power for operating the drive control section is to be connected,
the module further comprising:
a driving circuit board provided with the plurality of first power terminals, and
a communication circuit board provided with the plurality of second power terminals,
wherein
the plurality of first power terminals have the same shape and are electrically connected to each other, and
the plurality of second power terminals have the same shape and are electrically connected to each other.

\* \* \* \* \*